Figure 1:
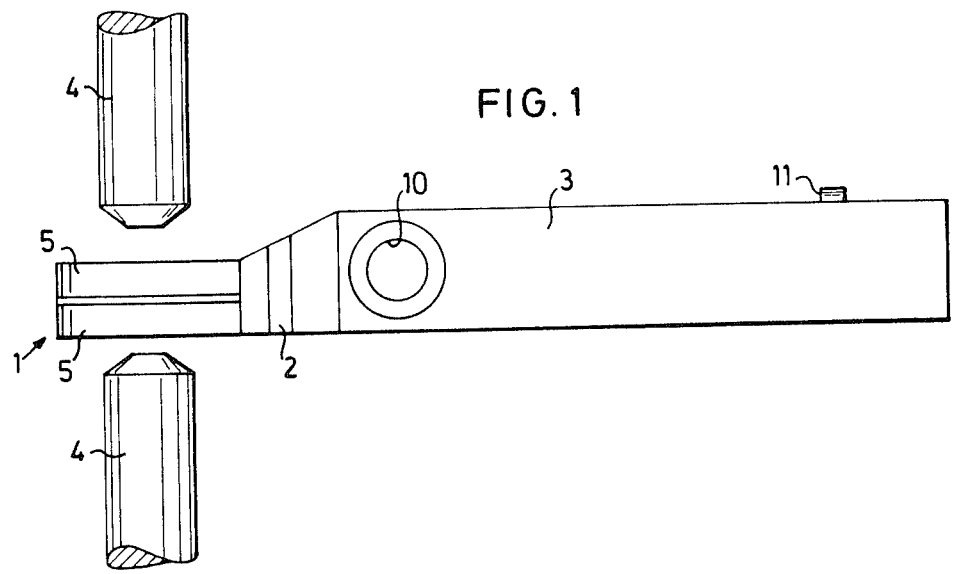

United States Patent [19]

Hass

[11] Patent Number: 4,485,683
[45] Date of Patent: Dec. 4, 1984

[54] INSTRUMENT FOR MEASURING THE CLAMPING FORCE BETWEEN A PAIR OF WELDING ELECTRODES

[75] Inventor: Bertil Hass, Olofström, Sweden
[73] Assignee: AB Volvo, Goteborg, Sweden
[21] Appl. No.: 414,260
[22] PCT Filed: Dec. 21, 1981
[86] PCT No.: PCT/SE81/00386
 § 371 Date: Aug. 18, 1982
 § 102(e) Date: Aug. 18, 1982
[87] PCT Pub. No.: WO82/02163
 PCT Pub. Date: Jul. 8, 1982

[30] Foreign Application Priority Data

Dec. 23, 1980 [SE] Sweden .................. 8009094

[51] Int. Cl.$^3$ .......................... G01D 1/12; G01L 1/22
[52] U.S. Cl. .................. 73/862.53; 73/862.65
[58] Field of Search ........... 73/862.53, 862.67, 862.65, 73/770; 219/109, 110

[56] References Cited

U.S. PATENT DOCUMENTS

| | | | |
|---|---|---|---|
| 2,430,237 | 11/1947 | Moncher | 219/110 |
| 2,616,014 | 10/1952 | Ellerby | 219/109 |
| 2,744,182 | 5/1956 | Gross | 219/110 |
| 3,222,923 | 12/1965 | Lebow | 73/862.65 X |
| 4,307,608 | 12/1981 | Useldinger et al. | 73/862.53 X |

FOREIGN PATENT DOCUMENTS

| | | |
|---|---|---|
| 741925 | 11/1943 | Fed. Rep. of Germany . |
| 1569022 | 4/1969 | France . |
| 723366 | 2/1955 | United Kingdom . |
| 849494 | 9/1960 | United Kingdom . |
| 1162915 | 9/1969 | United Kingdom . |
| 1385427 | 2/1975 | United Kingdom . |

Primary Examiner—Charles A. Ruehl
Assistant Examiner—James R. Giebel
Attorney, Agent, or Firm—Young & Thompson

[57] ABSTRACT

Portable measuring instrument for measuring the clamping force between a pair of welding electrodes in spot welding. The instrument comprises a measuring cell (1) designed to be inserted between a pair of welding electrodes. The measuring cell contains a wire strain bridge for measuring the clamping force between the welding electrodes and a pair of electrodes (5) in a voltage detector for indicating the turning on of the welding current. The measuring cell is connected electrically to an electronic unit with optical indicating means (9), e.g. an LED stack, which indicates the magnitude of the clamping force when the welding current is turned on, and also the maximum clamping force attained during welding, and separately preserves the display of both of these values. The LED stack and the electronics are arranged in an apparatus casing (3).

4 Claims, 4 Drawing Figures

INSTRUMENT FOR MEASURING THE CLAMPING FORCE BETWEEN A PAIR OF WELDING ELECTRODES

The present invention relates to a portable measuring instrument for measuring the clamping force between a pair of welding electrodes in spot welding.

The working control cycle of a mechanically driven spot welding machine is initiated by an impulse from a welding timer activating the valve which controls the working cylinder providing the electrode movement and force. When a predetermined electrode force has been reached, the welding process itself is initiated by the welding current being turned on in the conventional automatic manner. The time from the moment the valve controlling the electrode movement is activated up to the moment when the current is turned on is called the squeeze time, and it is of great importance that this time be correctly set. If it is too short, insufficient electrode force will be built up, resulting in poor weld quality. If it is too long, the welding cycle will be unnecessarily extended, lowering the rate of production.

The length of the required squeeze time is dependent on a number of factors, such as the type of welding machine, air or hydraulic operation, valve and pipe arrangements, requirements for quiet and smooth operation of the equipment, etc. Thus it is not possible to give any general values of the length of the squeeze time.

Methods known up to now for checking that the squeeze time has a suitable length are relatively complicated and involve the moving of a recording oscilloscope with the necessary adaptor equipment to the welding machine as well as hooking up and adjustment. Disruption of production is thus unavoidable.

The purpose of the present invention is to achieve a measuring instrument which provides directly information on the squeeze process and which is small enough to be easily carried on one's person. A further purpose is to achieve an instrument which does not require special electrical connection to the welding machine thus disrupting production only very minimally.

This is achieved according to the invention by means of an instrument which has a load cell equipped with a wire strain bridge for example, which can be inserted between a pair of welding electrodes to measure the clamping force therebetween and which is coordinated with a pair of electrodes in a voltage detector to indicate voltage between the welding electrodes, the load cell and the voltage detector being coupled to an electronic unit with optical indicating means, which indicate the size of the clamping force at the moment when voltage appears between the welding electrodes.

The instrument according to the invention provides information on the magnitude of the clamping force when the welding current is turned on, which makes it possible to determine directly whether the squeeze time is too short or too long.

Figure 2:
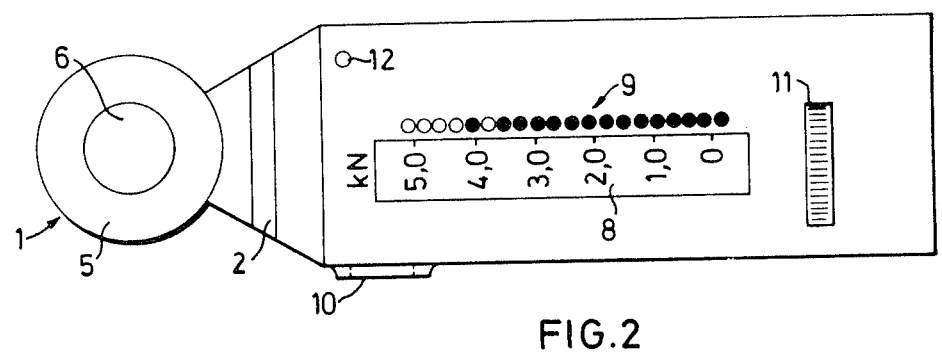
Figure 3:
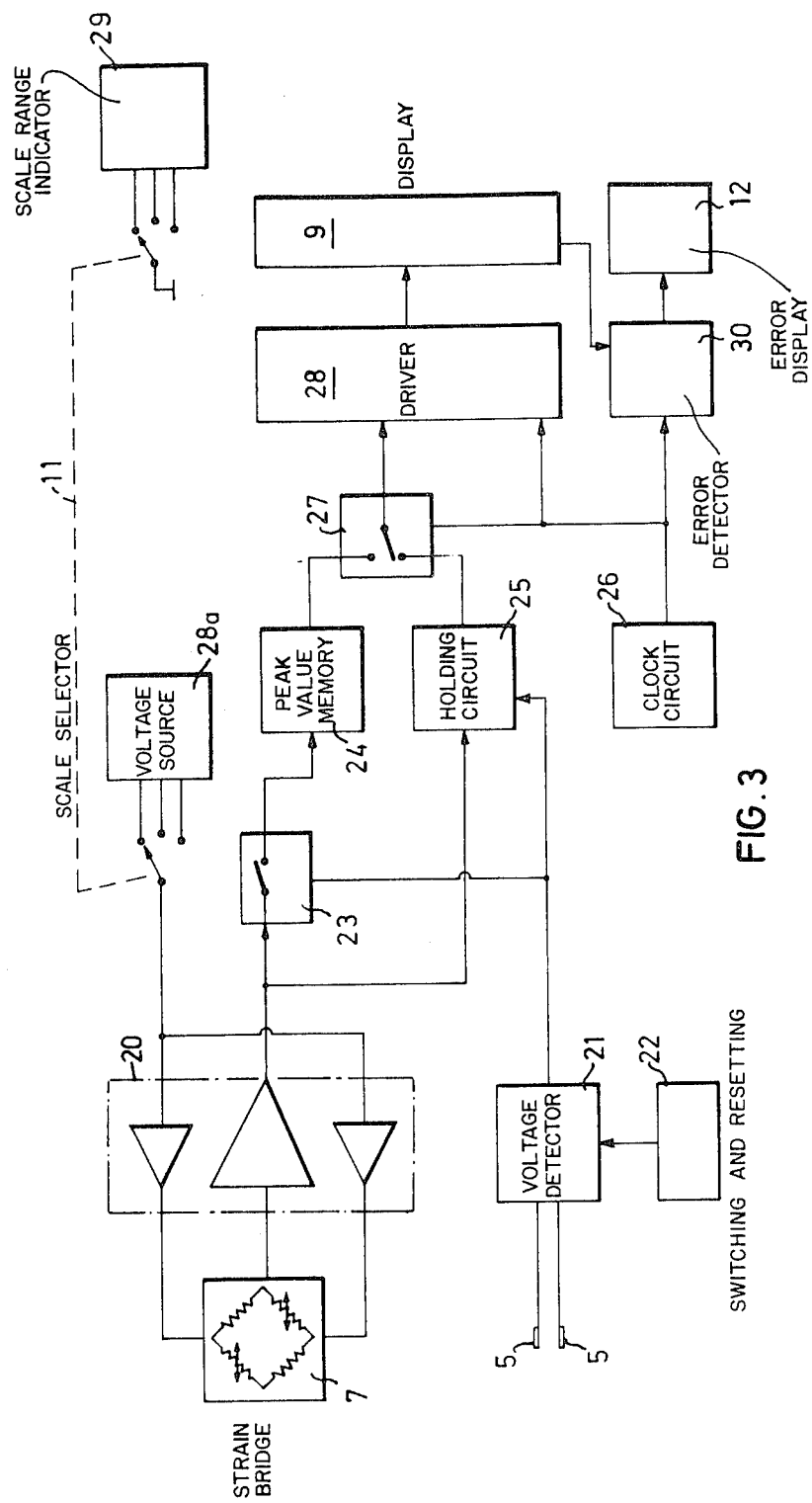
Figure 4:
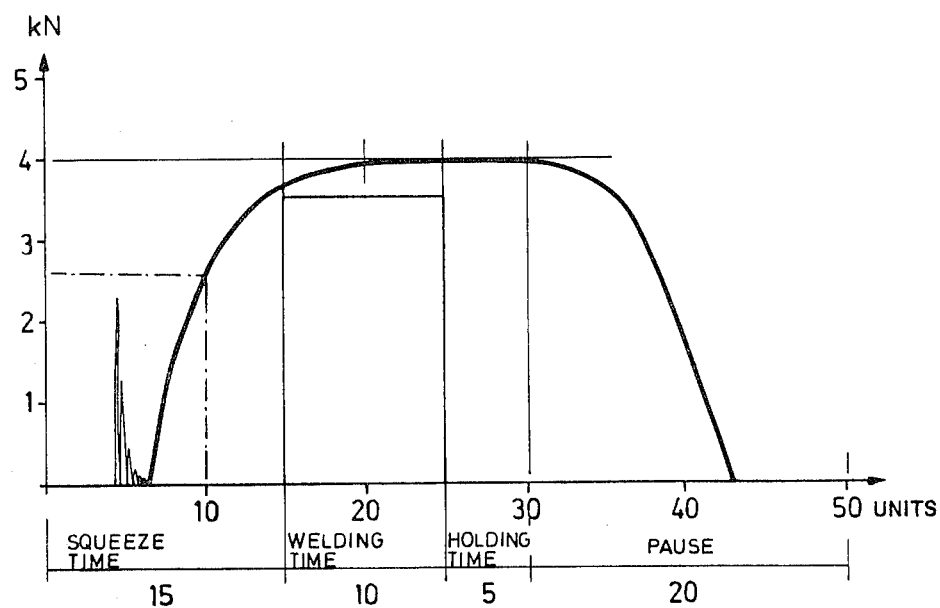

The invention will be described in more detail with reference to the embodiment shown on the accompanying drawings, of which:

FIGS. 1 and 2 show a side view and a plan view respectively of one embodiment of an instrument according to the invention, FIG. 3 shows a block diagram of the instrument electronics, and, FIG. 4 shows a diagram of the clamping force as a function of time during one welding cycle.

The instrument according to the invention comprises a measuring cell, generally designated 1 which, via a flexible connection 2 of rubber for example, is connected to an apparatus casing 3 containing the electronics shown in the block diagram in FIG. 3.

The measuring cell 1, which is intended to be inserted between a pair of welding electrodes 4 in a spot welding machine, has a pair of circular plates 5 of electrically conducting material which are electrically insulated from each other by means of an intermediate insulation. The plates 5 are provided with flat striking surfaces 6 and carry between them a force measuring means in the form of a wire strain bridge 7 (see FIG. 3).

On the apparatus casing 3, which also serves as a handle for use of the instrument, there is an optical indicator in the form of a scale 8 with a stack of light-emitting diodes 9 indicating the clamping force which the measuring cell 1 is subjected to by the welding electrodes 4. Furthermore, there is a button 10 for turning on/off and resetting, a combined scale changing control and switch 11 as well as an LED 12 which indicates if the wrong measuring range has been selected.

In use, the instrument is held in one hand and is activated by pressing in the button 10 and holding it pressed in, whereafter the measuring cell 1 is inserted between the welding electrodes 4, as shown in FIG. 1. Then the welding machine is activated, so that a work cycle is run through. When the electrodes 4 clamp the measuring cell, any obliqueness of the instrument is compensated for by the flexible connection 2, so that the instrument is not knocked out of the hand of the user. After the welding cycle has been completed, the instrument is removed with the button 10 still pressed in, and the electrode force can be read directly on the LED stack 9. The instrument provides information both on the clamping force upon turning on of the welding current and on the maximum welding force. In FIG. 2, the filled-in circles in the stack 9 represent lighted diodes, and the uppermost lighted diode in the continuous stack indicates the clamping force when the welding current is turned on, while the solitary lighted diode above the stack indicates the top value, i.e. the maximum clamping force.

FIG. 3 shows a block diagram of the circuits connected between the wire strain bridge 7, the plates 5 and the LED stack 9; where 20 designates an amplifier and 21 designates a voltage detector with a circuit 22 for switching on and resetting, activated by the button 10. 23 designates a switch controlled by the voltage detector, while 24 and 25 designate a peak value memory and a sampling and holding circuit respectively, which via a switch 27 controlled by a clock circuit 26 provide an analogue voltage value to a driver 28 for the LED stack 9. Before the welding current is turned on, the switch 23 is in the position shown in the figure, which means that the stack of lighted diodes grows as the clamping force of the electrodes 4 increases. When the welding current is turned on, the switch 23 changes position with the result that the driver 28 alternatingly via the switch 27 controlled by the clock circuit 26 receives voltage from the sampling and holding circuit 25 and the peak value memory 24. The holding circuit 25 "freezes" the level of the diode stack when the current is turned on, while the peak value memory stores the peak value of the clamping force and displays this as a single point.

FIG. 2 shows that the clamping force between the electrodes 4, when the current was turned on, was about 3.5 kN, while the peak value was 4 kN. This sequence is illustrated in FIG. 4 and means that the squeeze time was 15 units of time.

In the welding cycle shown as an example in the diagram in FIG. 4, the turning on of the current occurred just before full electrode force was achieved and the welding current was kept on for 10 units of time. Full clamping force between the electrodes was maintained for 5 units after the current was turned off, followed by a pause of 20 units until the start of the next welding cycle to provide time for the electrodes to be unloaded and separated from the workpiece.

If the LED stack had given a reading of 2.5 kN, the squeeze time would have been too short, i.e. 10 units (see FIG. 4).

In addition to the above-mentioned electronics, the block diagram in FIG. 3 also includes a voltage source 28a and a scale range indicator 29, which is controlled by the selector knob 11. Finally, there is a circuit 30 for detecting the choice of a too low measuring range, which is indicated by the diode 12.

I claim:

1. In a portable measuring instrument for measuring the clamping force between a pair of welding electrodes, comprising a force measuring cell including a wire strain bridge which is insertable between a pair of welding electrodes for measuring the clamping force therebetween and which coacts with a pair of electrodes in a voltage detector for detecting voltage between the welding electrodes; the improvement comprising visible indicating means, an electronic unit connecting said measuring cell and voltage detector to said indicating means, said indicating means indicating clamping force applied by said welding electrodes electrodes, the voltage detector being adapted to send to the electronic unit an impulse when a voltage appears between the welding electrodes, to cause the optical indicating means to indicate the value of the clamping force at the moment the voltage appears, said electronic unit being adapted to retain this value on the indicating means regardless of changes in the clamping force after the voltage appears.

2. An instrument as claimed in claim 1, said voltage detector being adapted to send to said electronic unit an impulse to cause the indicating means to indicate the maximum value of the clamping force attained after the voltage appears, said indicating means being adapted to retain the display of said maximum clamping force regardless of changes in the clamping force after said maximum value is attained.

3. An instrument as claimed in claim 1, said electronic unit and indicating means being disposed in a hand held casing, said force measuring cell and electrodes being supported on the casing by means of a flexible connector.

4. An instrument as claimed in claim 1, in which said electrodes are a pair of electrically conducting plates electrically insulated from each other and housing the measuring cell between them.

* * * * *